(12) United States Patent
Braun et al.

(10) Patent No.: US 8,230,957 B2
(45) Date of Patent: Jul. 31, 2012

(54) FLOW-INDUCING BAFFLE FOR ENGINE COMPARTMENT VENTILATION

(75) Inventors: Kevin Gordon Braun, Dubuque, IA (US); Steven Richard Sass, Dubuque, IA (US); Michael Paul Faust, Garber, IA (US); Jesse Adam Crane, Waterloo, IA (US)

(73) Assignee: Deere & Company, Moline, IL (US)

( * ) Notice: Subject to any disclaimer, the term of this patent is extended or adjusted under 35 U.S.C. 154(b) by 583 days.

(21) Appl. No.: 12/022,535

(22) Filed: Jan. 30, 2008

(65) Prior Publication Data

US 2009/0188734 A1    Jul. 30, 2009

(51) Int. Cl.
*B60K 11/00* (2006.01)
*F01P 7/02* (2006.01)

(52) U.S. Cl. .................................. 180/68.1; 123/41.49
(58) Field of Classification Search ................. 180/68.1, 180/68.2; 123/41.49
See application file for complete search history.

(56) References Cited

U.S. PATENT DOCUMENTS

| | | | |
|---|---|---|---|
| 3,002,585 A | 9/1960 | Pasturczak | |
| 3,987,766 A | 10/1976 | Welck | |
| 3,996,999 A | 12/1976 | Termont et al. | |
| 4,180,130 A * | 12/1979 | Beck et al. | 165/124 |
| 4,184,541 A * | 1/1980 | Beck et al. | 165/125 |
| 4,186,817 A * | 2/1980 | Bauer | 180/68.1 |
| 4,202,296 A * | 5/1980 | Nonnenmann et al. | 123/41.48 |
| 4,213,426 A * | 7/1980 | Longhouse | 123/41.49 |
| 4,233,040 A | 11/1980 | Vogelaar et al. | |
| 4,235,307 A | 11/1980 | Browning et al. | |
| 4,250,897 A | 2/1981 | Glaser | |
| 4,260,037 A | 4/1981 | Eline | |
| 4,289,096 A | 9/1981 | Latham et al. | |
| 4,339,014 A * | 7/1982 | Berth et al. | 180/68.1 |
| 4,382,481 A * | 5/1983 | Moore | 180/68.1 |
| 4,432,309 A | 2/1984 | Hutchison et al. | |
| 4,512,414 A | 4/1985 | Kuhn et al. | |
| 4,542,623 A * | 9/1985 | Hovan et al. | 60/226.1 |
| 4,573,544 A * | 3/1986 | Hoch et al. | 180/68.1 |
| 4,606,422 A | 8/1986 | Jewett | |
| 4,862,981 A | 9/1989 | Fujikawa et al. | |
| 4,969,533 A | 11/1990 | Holm et al. | |
| 5,060,740 A | 10/1991 | Yousef et al. | |
| 5,125,474 A | 6/1992 | Lee et al. | |
| 5,174,406 A * | 12/1992 | Lee | 180/68.2 |
| 5,590,624 A * | 1/1997 | Emond et al. | 123/41.49 |
| 5,709,175 A * | 1/1998 | Carroll | 123/41.49 |
| 5,839,397 A * | 11/1998 | Funabashi et al. | 123/41.01 |

(Continued)

FOREIGN PATENT DOCUMENTS

DE    102007036409 A1    2/2008

(Continued)

OTHER PUBLICATIONS

PCT International Search Report (2 pages) and Written Opinion of the International Searching Authority (6 pages) dated Oct. 7, 2008.

*Primary Examiner* — John R Olszewski
*Assistant Examiner* — Jacob Meyer

(57) ABSTRACT

A work machine comprises a baffle configured to divert air flow from a source of pressurized air laterally outwardly toward a peripheral edge of the baffle to create a flow-inducing region about the peripheral edge to ventilate the engine compartment.

7 Claims, 9 Drawing Sheets

U.S. PATENT DOCUMENTS

| | | | |
|---|---|---|---|
| 5,884,589 A * | 3/1999 | Sakamoto et al. | 123/41.49 |
| 6,068,675 A | 5/2000 | Tsuda et al. | |
| 6,167,976 B1 * | 1/2001 | O'Neill et al. | 180/69.2 |
| 6,202,777 B1 | 3/2001 | Surridge | |
| 6,302,066 B1 * | 10/2001 | Steinmann | 123/41.49 |
| 6,302,228 B1 * | 10/2001 | Cottereau et al. | 180/68.1 |
| 6,604,360 B1 | 8/2003 | Vuk | |
| 6,622,668 B2 | 9/2003 | Izumi | |
| 6,871,697 B2 * | 3/2005 | Albright et al. | 165/51 |
| 7,051,786 B2 | 5/2006 | Vuk | |
| 7,143,852 B2 * | 12/2006 | Yatsuda et al. | 180/69.2 |
| 7,197,891 B2 | 4/2007 | Hofle et al. | |
| 7,204,329 B2 | 4/2007 | Pfohl et al. | |
| 7,251,937 B2 | 8/2007 | Appleton | |
| 7,254,947 B2 | 8/2007 | Burk et al. | |
| 7,290,630 B2 * | 11/2007 | Maeda et al. | 180/68.4 |
| 7,325,518 B2 | 2/2008 | Bering | |
| 7,451,844 B2 * | 11/2008 | Kunikata | 180/68.1 |
| 2002/0069863 A1 * | 6/2002 | Duda et al. | 123/568.29 |
| 2005/0016193 A1 | 1/2005 | Tarasinski et al. | |
| 2005/0211483 A1 | 9/2005 | Pfohl et al. | |
| 2005/0217907 A1 | 10/2005 | Madson et al. | |
| 2006/0213708 A1 | 9/2006 | Witwer et al. | |
| 2006/0266309 A1 | 11/2006 | Lang et al. | |
| 2006/0283157 A1 * | 12/2006 | Keys et al. | 55/290 |
| 2007/0007061 A1 | 1/2007 | Meyer et al. | |
| 2007/0107421 A1 | 5/2007 | Emmert et al. | |
| 2007/0204751 A1 | 9/2007 | Wirth et al. | |

FOREIGN PATENT DOCUMENTS

| | | |
|---|---|---|
| EP | 1865207 A2 | 12/2007 |
| GB | 780835 | 8/1957 |
| GB | 932590 | 7/1963 |

* cited by examiner

US 8,230,957 B2

FLOW-INDUCING BAFFLE FOR ENGINE COMPARTMENT VENTILATION

FIELD OF THE DISCLOSURE

The present disclosure relates to engine compartment ventilation.

BACKGROUND OF THE DISCLOSURE

The engine of a work machine is typically located in an engine compartment. Engine operation may heat the engine compartment, such as by radiant and convective heat transfer from the engine. Excessively high engine compartment temperatures could put electronic or polymer components at risk for damage.

In a conventional sucker cooling system, the cooling fan discharges heated air from the heat exchangers into the engine compartment, adding to the heat in the engine compartment. One existing method of reducing engine compartment temperatures with a conventional sucker cooling system is to place a wall or baffle between the engine and cooling package that completely seals off the two spaces.

SUMMARY OF THE DISCLOSURE

According to the present disclosure, there is provided a work machine comprising a baffle configured to divert air flow from a source of pressurized air laterally outwardly toward a peripheral edge of the baffle to create a flow-inducing region about the peripheral edge to ventilate an engine compartment of the work machine. Exemplarily, the baffle is positioned between the source of pressurized air and the engine compartment, and the baffle flares laterally outwardly relative to an axis as the baffle extends along the axis away from the source of pressurized air toward the engine compartment so as to divert air flow from the source of pressurized air laterally outwardly toward the peripheral edge of the baffle to create the flow-inducing region, about the peripheral edge and in fluid communication with the engine compartment, that ventilates the engine compartment.

The baffle may be positioned within a housing between the source of pressurized air and the engine. The baffle thus partitions an interior region of the housing into a cooling compartment in which the source of pressurized air is positioned and the engine compartment in which an engine is positioned.

The baffle may comprise a main body in the form of a frusto-pyramidal section and a lip flared laterally outwardly relative to the main body as the lip extends from the main body to the peripheral edge. As such, the main body may comprise an isosceles trapezoid top panel, a non-isosceles trapezoid first side panel, and a non-isoceles trapezoid second side panel opposite the first side panel, the top panel and the first side panel meet along a first edge, and the top panel and the second side panel meet along a second edge.

The work machine may further comprise a second baffle located in the engine compartment. In such a case, the two baffles may be arranged so as to cooperate to define therebetween a ventilation passageway leading from the engine compartment to a peripheral space between the peripheral edge and the housing for discharge of the engine compartment air flow from the engine compartment through a ventilation outlet of the housing.

The above and other features will become apparent from the following description and the attached drawings.

BRIEF DESCRIPTION OF THE DRAWINGS

The detailed description of the drawings refers to the accompanying figures in which.

DETAILED DESCRIPTION OF THE DRAWINGS

Figure 1:
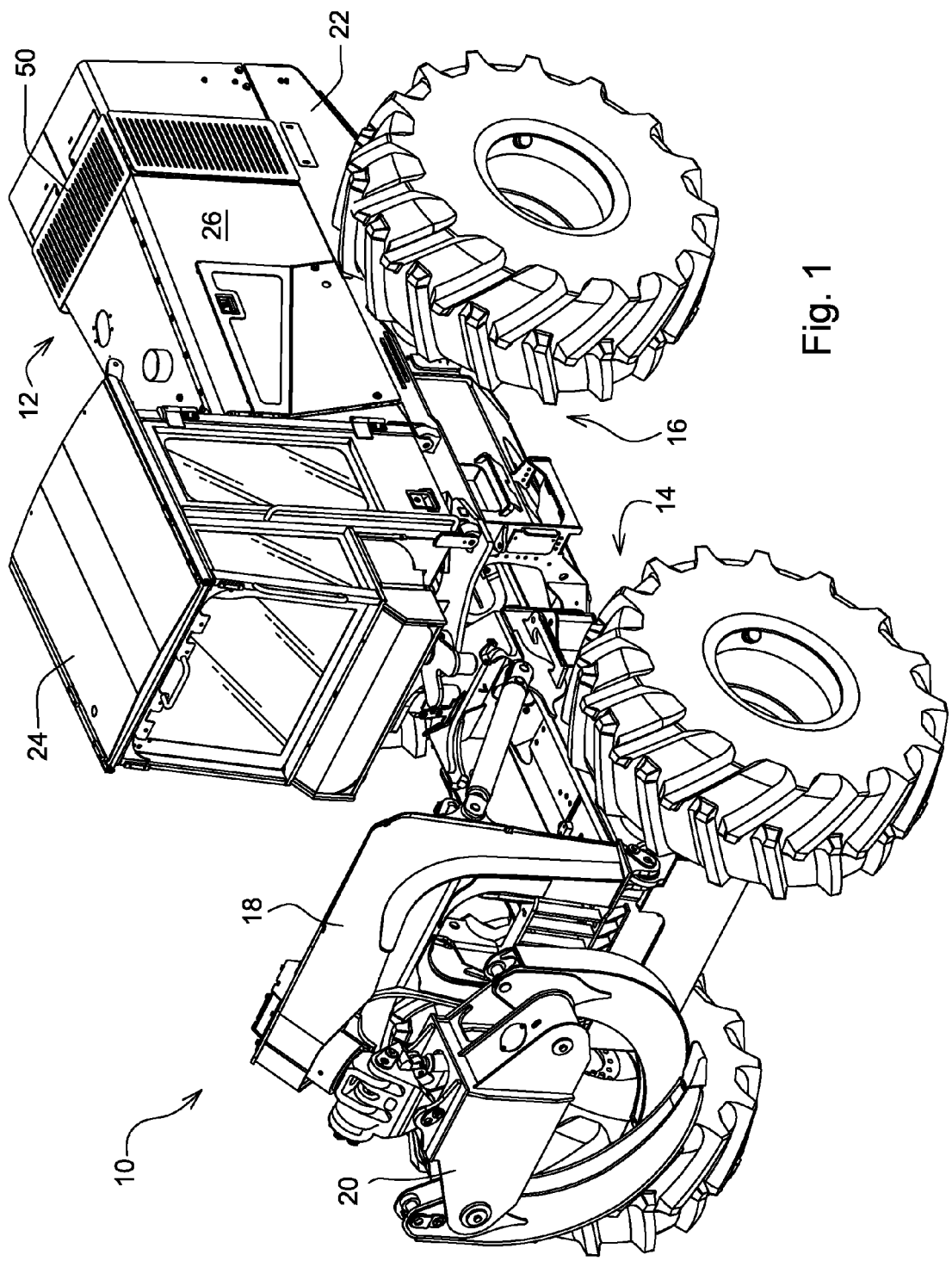
FIG. 1 is a perspective view of a work machine in the form of, for example, a log skidder.
Figure 2:
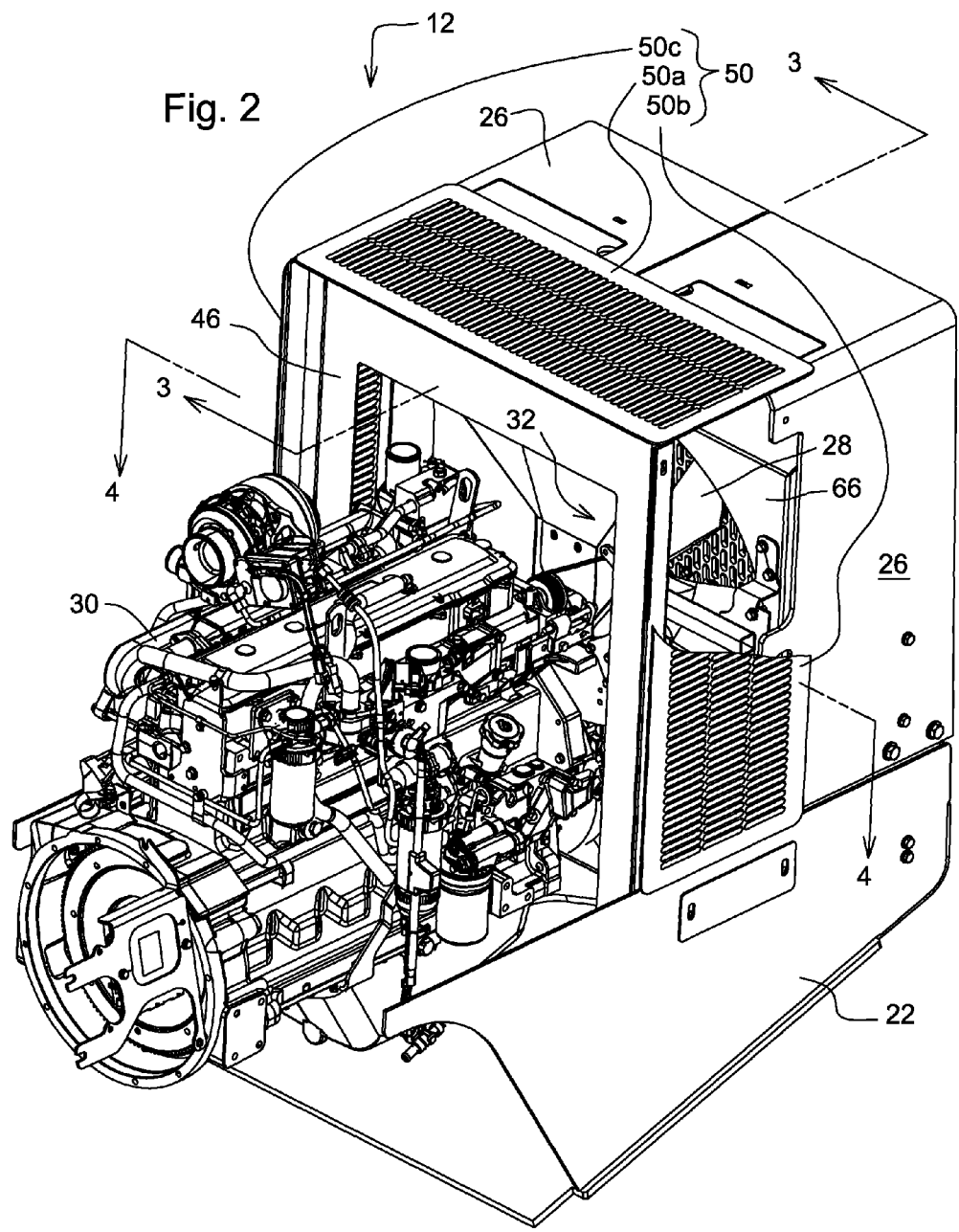
FIG. 2 is a fragmentary perspective view of a front section of the work machine.

Referring to FIG. 1, an exemplary work machine 10 has an engine-and-cooling unit 12. Illustratively, the work machine 10 is a log skidder, although it could be any of a variety of work machines.

In the case of a skidder, the machine 10 has rear and front sections 14, 16 articulated to one another. The rear section 14 has an arch 18 pivotable to raise and lower an attachment 20 (e.g., grapple or cable) for gripping the tree. The front section 16 has the engine-and-cooling unit 12 mounted on a frame 22 in front of the operator's station 24.

Referring to FIGS. 2-5, the engine-and-cooling unit has a housing 26, a source of pressurized air 28 (e.g., a fan such as an axial fan), an engine 30, and a flow-inducing, first baffle 32. The baffle 32 is positioned within the housing 26 between the source of pressurized air 28 and the engine 30 so as to partition an interior region 34 of the housing 26 into a cooling compartment 36 in which the source of pressurized air 28 is positioned and an engine compartment 38 in which the engine 30 is positioned. As shown best in FIG. 4, the baffle 32 flares laterally outwardly relative to an axis 40 as the baffle 32 extends along the axis 40 away from the source of pressurized air 28 toward the engine compartment 38 so as to divert air flow 41 from the source of pressurized air 28 laterally outwardly toward a peripheral edge 42 of the baffle 32 to create a flow-inducing region 43, in a peripheral space 44 between the peripheral edge 42 and the housing 26 and in fluid communication with the engine compartment 38, that induces an engine compartment air flow 45 so as to ventilate the engine compartment 38.

A second baffle 46 is positioned in the engine compartment 38. The baffles 32, 46 cooperate to define therebetween a ventilation passageway 48 leading from the engine compartment 38 to the peripheral space 44. The ventilation passageway 48 conducts the engine compartment air flow 45 from the engine compartment 38 to the peripheral space 44 for discharge from the interior region 34 through a ventilation outlet 50 of the housing 26.

Figure 6:
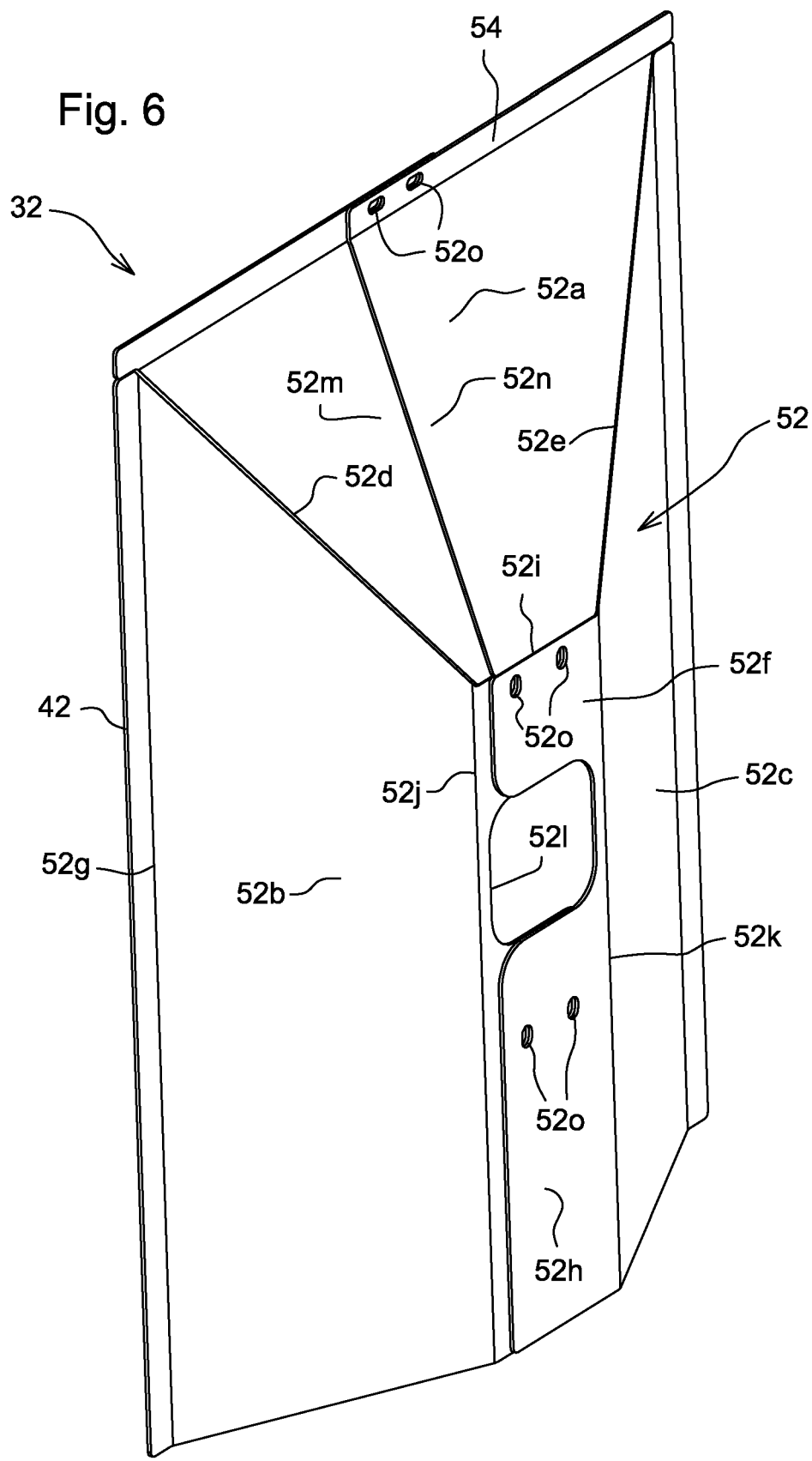
FIG. 6 is a front perspective view of a flow-inducing baffle of the work machine.
Figure 7:
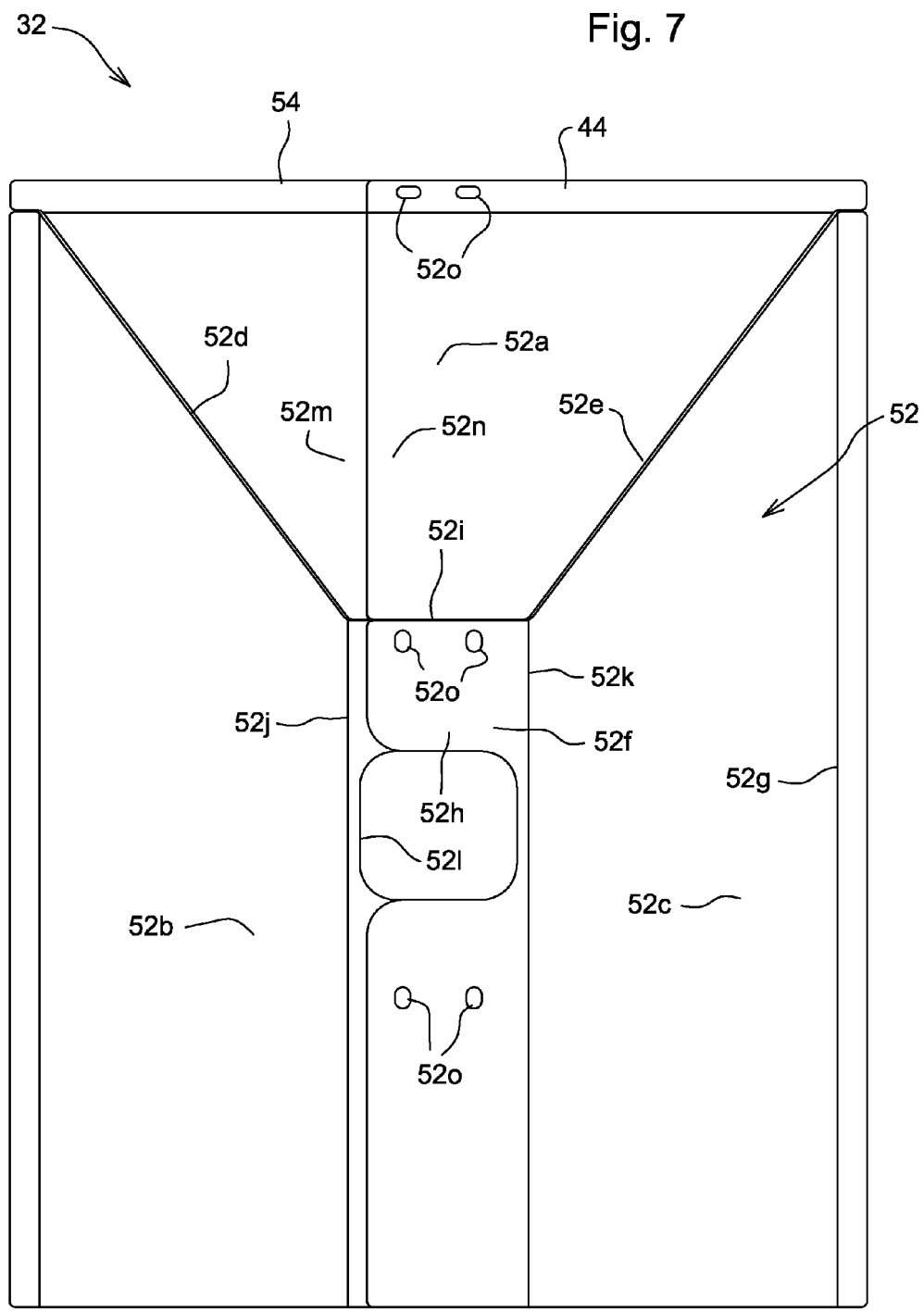
FIG. 7 is a front elevation view of the flow-inducing baffle.

Referring to FIGS. 6 and 7, the first baffle 32 has a main body 52 and a lip 54 disposed about at least part of the main body 52. The main body 52 has the form of, for example, a frusto-pyramidal section (e.g., a rectangular frusto-pyramidal section). Exemplarily, the main body 52 comprises an isosceles trapezoid top panel 52a, a non-isosceles trapezoid first side panel 52b, and a non-isoceles trapezoid second side panel 52c opposite the first side panel 52b. The top panel 52a and the first side panel meet 52b along a first edge 52d. The top panel 52a and the second side panel 52c meet along a second edge 52e. The first and second side panels 52b, 52c are upright on a platform 56 of the housing 26, and support the top panel 52a above platform 56.

The main body 52 further has a basal, first end 52f and a second end 52g opposite to and narrower than the first end 52f. An end panel 52h positioned at the first end 52f is connected to the top and side panels 52a, 52b, 52c such that the end panel 52h meets the top panel 52a along a third edge 52i, meets the first side panel 52b along a fourth edge 52j, and meets the second side panel 52c along a fifth edge 52k. A hole 52l is formed in the end panel 52h, and a hydraulic motor 58 (FIGS. 3 and 4) is mounted in the hole 52l and operably connected to the source of pressurized air 28 (e.g., an axial cooling fan or other cooling fan) for operation thereof. In other examples, the source of pressurized air 28 may be driven directly by a pulley rotated by the engine, instead of hydraulically driven.

The lip 54 is connected to the basal end 52f such that it flares laterally outwardly therefrom to the peripheral edge 42 so as to include the peripheral edge 42. More particularly, the lip 54 is flared laterally outwardly from, and extends about, the top panel 52a and the first and second side panels 52b, 52c.

The baffle 32 may have two members or halves 52m, 52n that cooperate to provide the baffle 32 and its shape. The two members 52m, 52n may be configured as two formed sheets which overlap in a middle area of the baffle 32 and are fastened together by fasteners that extend through respective fastener-receiving holes 52o formed in the portions of the members 52m, 52n that provide the end panel 52h and lip 54. The members 52m, 52n overlap as such to prevent or otherwise inhibit leakage between the members 52m, 52n. Fabricating the baffle 32 out of the two members 52m, 52n, rather than just a single formed piece, facilitates servicing this portion of the skidder or other work machine 10.

Figure 3:
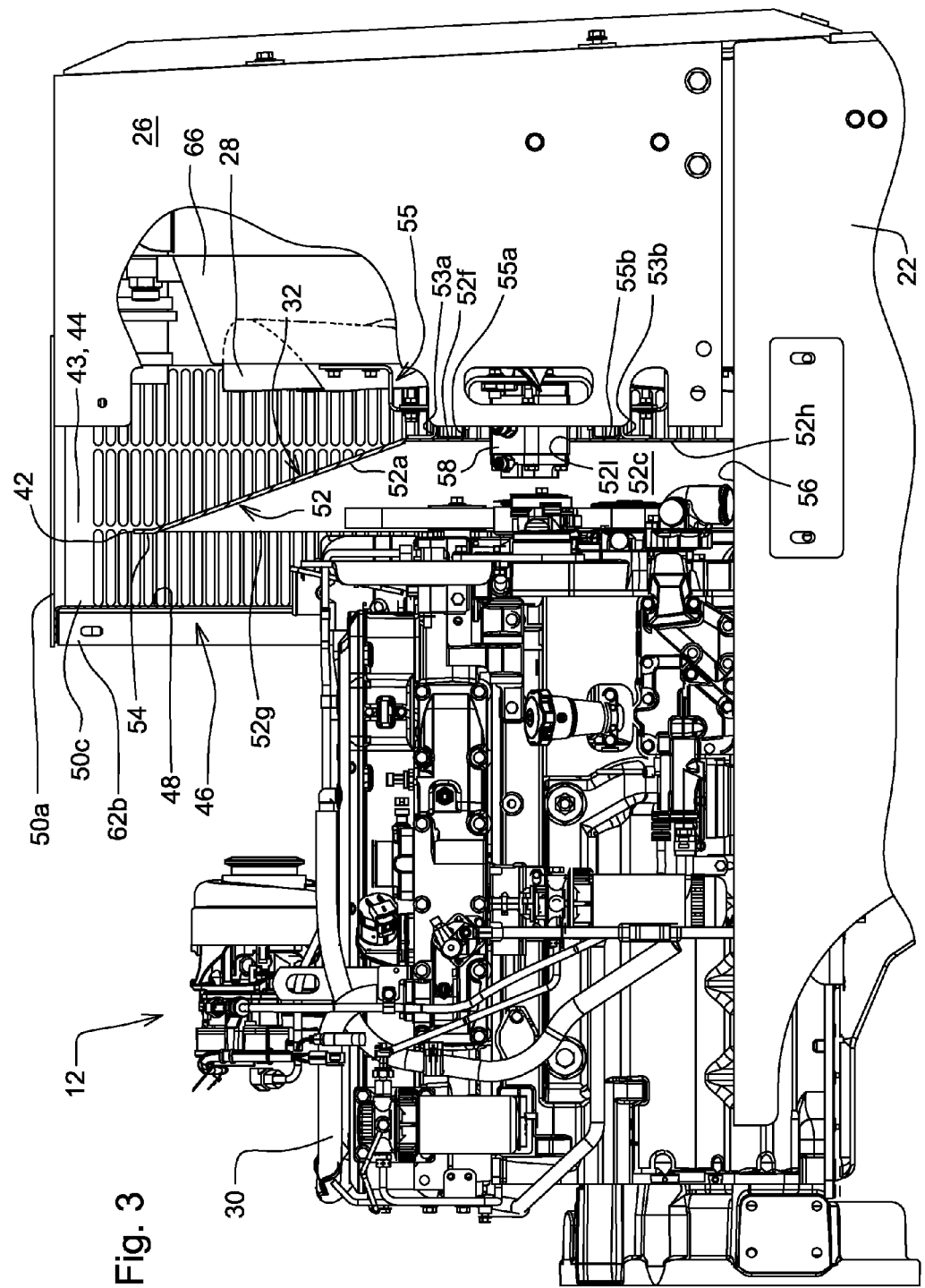
FIG. 3 is a sectional view taken along lines 3-3 of FIG. 2.
Figure 4:
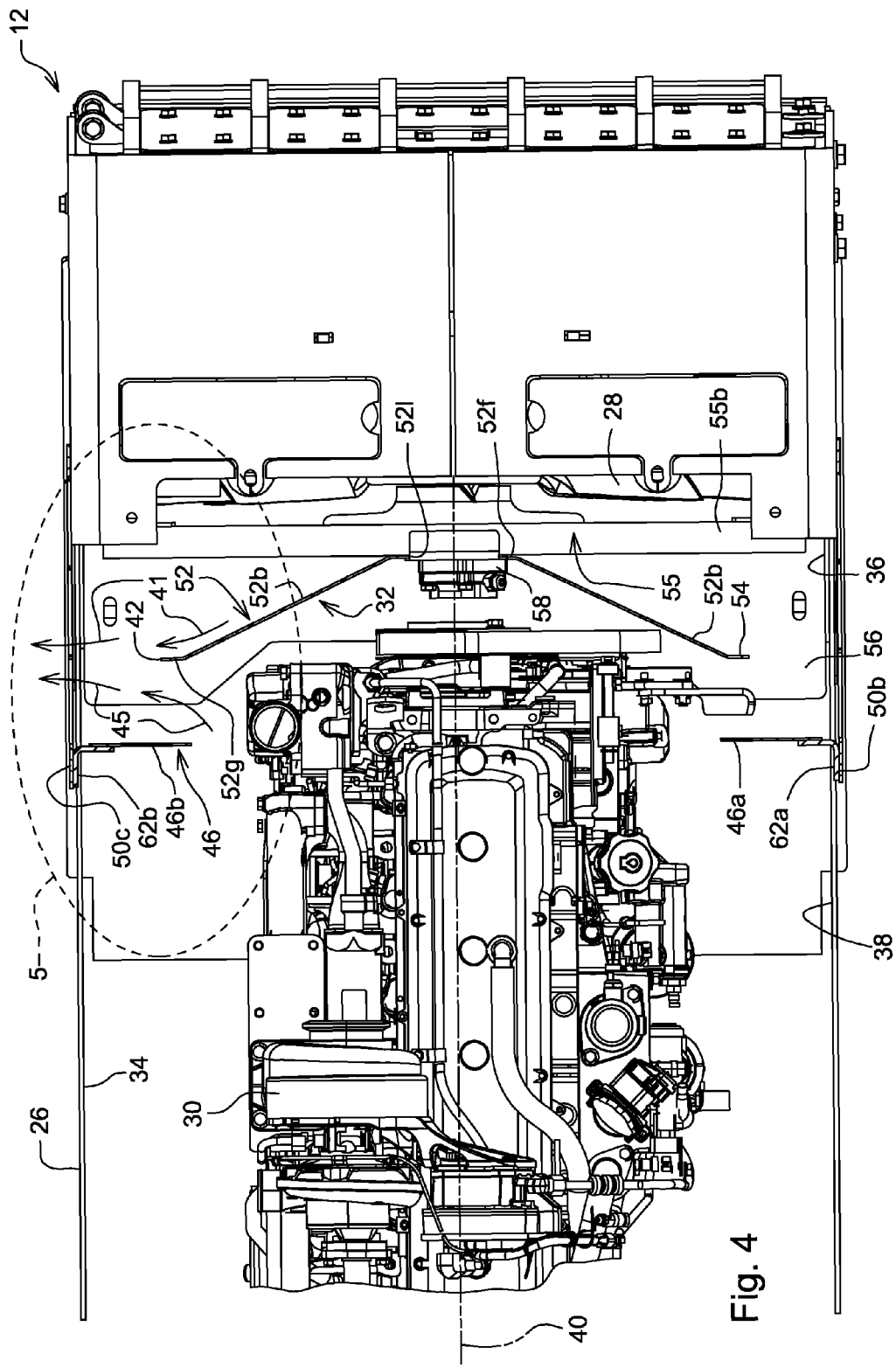
FIG. 4 is a sectional view taken along lines 4-4 of FIG. 2.

Referring to FIG. 3, the baffle 32 is mounted to the housing 26. The fasteners extending through fastener-receiving holes 52o attach the end panel 52h to upper and lower mounting brackets (e.g., angles) 53a, 53b or other baffle mount. The brackets 53a, 53b are, in turn, fixed to horizontal bars 55a, 55b of a mounting structure, such as, for example, an H-frame 55, anchored to the housing 26. In the case where the source 28 is a cooling fan, the fan shroud 66 of such fan may also be fixed to the mounting structure, or H-frame 55, so as to be mounted to the housing 26 as well.

Figure 5:
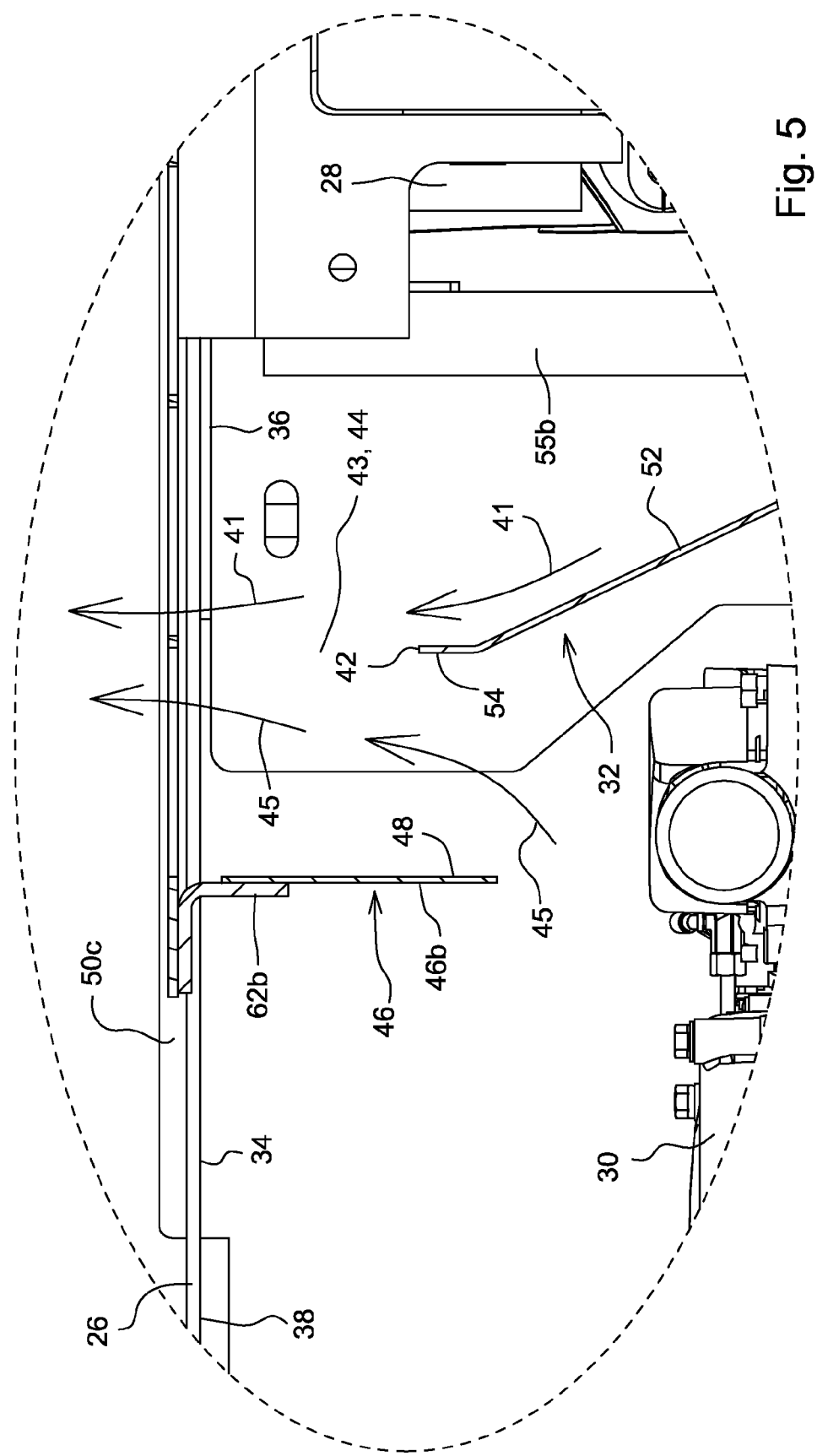
FIG. 5 is an enlarged view of region 5 of FIG. 4.
Figure 8:
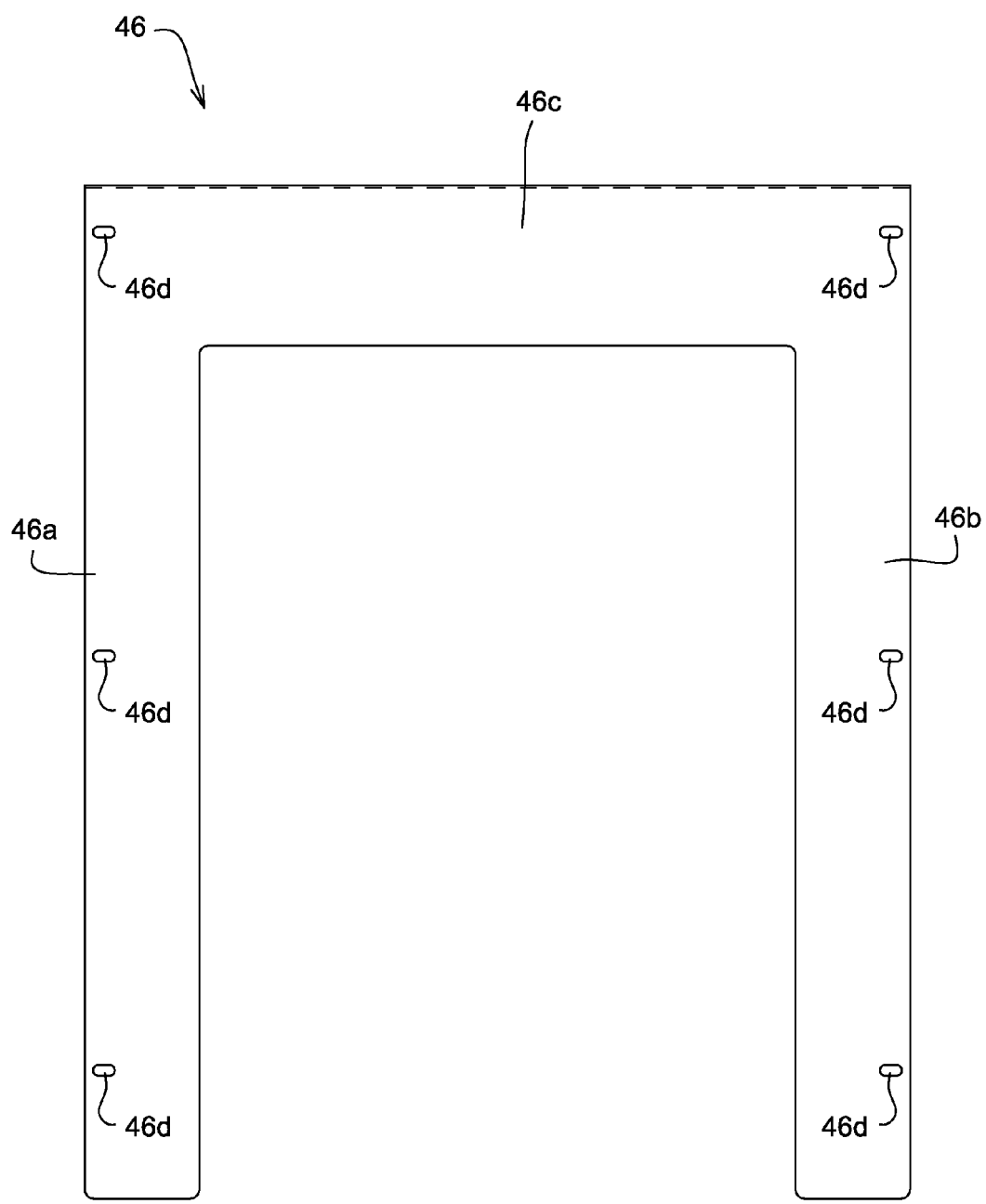
FIG. 8 is a front elevation view of another baffle of the work machine.

Referring to FIGS. 3, 5, and 8, the baffle 46 extends laterally inwardly from the housing 26. The housing 26 has the outlet 50 which may be configured, for example, as a number of screens, such as screens 50a, 50b, 50c, mounted along the top and two sides of the unit 12. The baffle 46 may be inverted U-shaped and configured as a plate with such a shape. In such a case, the baffle 46 may have a pair of legs 46a, 46b and a cross member 46c spanning between and connecting the legs 46a, 46b at the tops thereof.

The baffle 46 may be connected to the frame 22 in a variety of ways. For example, the legs 46a, 46b may be connected to mounting brackets 62a, 62b (e.g., angle bars) via fasteners extending through fastener-receiving holes 46d formed in the legs 46a, 46b, and the brackets 62a, 62b may be anchored to the frame 22 to fix the baffle 46 in place. In other examples, there may be one or more other mounting brackets, in place of or in addition to the brackets 62a, 62b, positioned in similar or other locations about the baffle 46 to anchor the baffle 46 to the frame 22 or to the housing 26.

Figure 9:
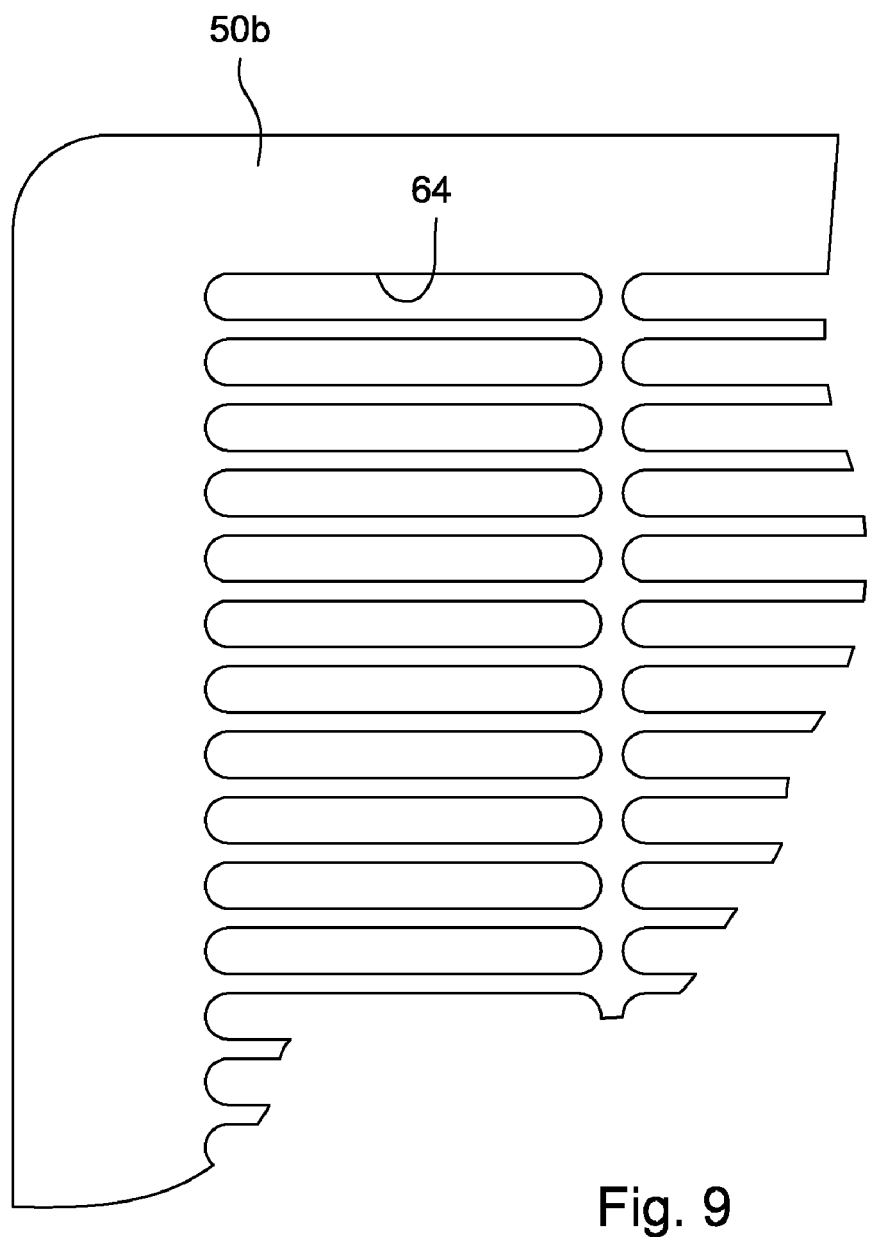
FIG. 9 is an elevation view of a portion of a ventilation outlet in the form of a screen.

Referring to FIG. 9, there is shown a portion of the outlet 50, in particular, a portion of one of the screens 50a, 50b, 50c, such as screen 50c. Each screen 50a, 50b, 50c may have elongated slots 64 or other openings formed therein. Exemplarily, each screen 50a, 50b, 50c has three columns of elongated slots 64. The obstructed portion of each screen 50a, 50b, 50c, and thus the outlet 50, helps to prevent ingress of debris and other prohibited items from entering the unit 12, whereas the screens 50a, 50b, 50c, and thus the outlet 50, are configured so as to be sufficiently open to facilitate induction of the engine compartment air flow 45 through the screens 50a, 50b, 50c. The percentage opening of each screen 50a, 50b, 50c may be, for example, 73% or thereabouts. The percentage opening may be greater than 73% and possibly even somewhat less than 73%. In testing, a percentage opening of 58% has been found to be too restrictive. To provide such percentage opening, the screens 50a, 50b, 50c may have a number (e.g., three columns) of elongated slots 64 or other opening(s).

In operation, the source of pressurized air 28 draws ambient air into the cooling compartment 36 and passed a number heat exchangers mounted therein (e.g., charge-air cooler, radiator, transmission oil cooler, hydraulic oil cooler, and/or air conditioning condenser). The source 28 pressurizes the air and advances it toward the baffle 32. The baffle 32 diverts such air flow 41 from the source of pressurized air 28 laterally outwardly relative to the axis 40 along the front side of the panels 52a, 52b, 52c and the lip 54 toward the peripheral edge 42 thereof. The main body 52 and the lip 54 thus accelerate the air flow 41 along the front side of the baffle 32 to create the flow-inducing region 43 in the peripheral space 44 between the peripheral edge 42 and the housing 26 and in fluid communication with the engine compartment 38. The platform 56 acts as a barrier that prevents or otherwise inhibits the air flow 41 from passing underneath the baffle 32 so that the air flow 41 is forced into the flow-inducing region 43. The flow-inducing region 43 induces the engine compartment air flow 45 so that the flow 45 advances out of the engine compartment 38 through the ventilation passageway 48, the peripheral space 44, and the screens 50a, 50b, and 50c of the outlet 50 to the exterior of the unit 12 so as to ventilate the engine compartment 38, thereby keeping the temperature within the engine compartment at acceptable levels.

Such flow-induction occurs possibly by a venturi effect and/or entrainment. It is believed that a role of the lip 54 is to accelerate the air flow 41 slightly, in addition to the acceleration provided by the main body 52, as it enters the flow-inducing region 43 to help create a weak venturi effect and/or to provide higher-velocity air and therefore a larger velocity gradient in the flow-inducing region 43 to entrain more engine compartment air flow 45.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A work machine, comprising:
   a housing,
   a source of pressurized air, an engine, a baffle positioned within the housing between the source of pressurized air and the engine so as to partition an interior region of the housing into a cooling compartment in which the source of pressurized air is positioned and an engine compartment in which the engine is positioned, wherein the baffle flares laterally outwardly relative to an axis as the baffle extends along the axis away from the source of pressurized air toward the engine compartment so as to divert air flow from the source of pressurized air laterally outwardly toward a peripheral edge of the baffle to create a flow-inducing region, in a peripheral space between the peripheral edge and the housing and in fluid communication with the engine compartment, that ventilates the engine compartment, the baffle including a main body in the form of a frusto-pyramidal section and a lip, the main body including a basal, first end and a second end opposite to and narrower than the first end, the lip flared outwardly from the second end of the main body to the peripheral edge.

2. The work machine of claim 1, wherein the main body comprises an isosceles trapezoid top panel, a non-isosceles trapezoid first side panel, and a non-isosceles trapezoid second side panel opposite the first side panel, the top panel and the first side panel meet along a first edge, and the top panel and the second side panel meet along a second edge.

3. The work machine of claim 2, wherein the lip is flared laterally outwardly from, and extends about, the top panel and the first and second side panels.

4. The work machine of claim 2, wherein the main body comprises an end panel at the second end of the baffle, the end panel and the top panel meet along a third edge, the end panel and the first side panel meet along a fourth edge, and the end panel and the second side panel meet along a fifth edge.

5. The work machine of claim 1, comprising a second baffle positioned in the engine compartment, the baffle and the second baffle cooperate to define therebetween a ventilation passageway leading from the engine compartment to the peripheral space, and the second baffle is inverted U-shaped.

6. The work machine of claim 2, wherein the housing comprises a platform, and the first and second side panels are upright on, and support the top panel above, the platform.

7. The work machine of claim 1, comprising a hydraulic motor, wherein the source of pressurized air is a cooling fan, and the hydraulic motor is operably connected to the cooling fan and is mounted in a hole formed in the second end of the baffle.

\* \* \* \* \*